United States Patent [19]

Uehara

[11] Patent Number: 4,792,873
[45] Date of Patent: Dec. 20, 1988

[54] MECHANISM FOR OPENING AND CLOSING THE SHUTTER OF A DISC CASSETTE

[75] Inventor: Tsukasa Uehara, Tokyo, Japan

[73] Assignee: Canon Kabushiki Kaisha, Tokyo, Japan

[21] Appl. No.: 929,616

[22] Filed: Nov. 12, 1986

[30] Foreign Application Priority Data

Nov. 12, 1985 [JP] Japan ................................ 60-252043
Nov. 12, 1985 [JP] Japan ................................ 60-252044

[51] Int. Cl.⁴ ..................... G11B 17/03; G11B 15/675
[52] U.S. Cl. ................................ 360/99.06; 360/96.5; 360/99.02
[58] Field of Search .................. 360/97, 99, 96.5, 96.6

[56] References Cited

U.S. PATENT DOCUMENTS 4,546,397 10/1985 Asami et al. .......................... 360/99
4,688,123 8/1987 Sokol et al. ............................ 360/99
4,724,498 2/1988 Takikawa et al. ..................... 360/97

*Primary Examiner*—Robert S. Tupper
*Attorney, Agent, or Firm*—Fitzpatrick, Cella, Harper & Scinto

[57] ABSTRACT

In the recording or reproduction apparatus using a disc cassette having a shutter releasably locked in the closed position, a mechanism for opening and closing the shutter as the disc cassette is inserted into, and pulled out of, the apparatus has its closing member made by bending an elastic line wire to such a form that the locking means can pass under it without being operated to release the shutter, but its engagement with the shutter is maintained against the load however large, when the shutter is closed.

15 Claims, 7 Drawing Sheets

MECHANISM FOR OPENING AND CLOSING THE SHUTTER OF A DISC CASSETTE

BACKGROUND OF THE INVENTION

1. Field of the Invention

This invention relates to mechanisms for opening and closing the shutter of a disc cassette, and more particularly to shutter opening and closing mechanisms adapted to be used with a disc cassette of the type having no biasing force in closing the shutter.

2. Description of the Related Art

Among the magnetic disc cassettes, for example, there is a type in which when not in use, an opening for entrance of a magnetic head is closed by a shutter. And, this shutter may be either biased by a spring or the like in a direction to be closed, or not.

The opening and closing mechanism for the shutter of the latter sort is illustrated in FIGS. 1 to 3. Referring to FIG. 1, a magnetic disc cassette 2 made of plastic contains a magnetic disc 1 having a center hub 3 fixed thereto. The hub 3 is rotatably fitted in round opening portions 5 formed through the upper and lower panels of the cassette 2 at the center of the area thereof. A PG pin 4 for indexing the phase of rotation of the disc 1 is buried in the center hub 3. Square openings 6 are formed in the upper and lower panels of the cassette 2 for a magnetic head to enter.

A shutter 7 of shape conformed to the openings 6 clamps across the thickness of the cassette 2 and is arranged to open and close the openings 6 when it slidingly moves in directions indicated by arrows P and Q respectively. A rectangular hole 7a is provided through the side wall of the shutter 7.

The cassette 2 has a groove 8 formed in that side wall thereof which is in contact with the side wall of the shutter 7, and has location through holes 9 and 10 upon engagement with respective pins of a magnetic recording or reproduction apparatus to be set in a prescribed position.

The shutter 7 also has a pawl 7b formed as extending upwardly of the inside of the side wall at a point ahead of the hole 7a in a direction in which the cassette 2 moves to be loaded on the apparatus.

Meanwhile, in the right hand lower corner as viewed in FIG. 2 within the cassette 2, there is a lock lever 11 made of synthetic resin or the like.

In FIG. 3, the lock lever 11 is fixed at its root to the housing of the cassette 2 by two fastener pins 12 and 13. Its free end 11a extends into a space beyond the outer side of the opening 6 but inside of the side wall of the shutter and has a hook 11c position as the terminal end of closing movement of the pawl 7b. Another arm 11b of short length normally abuts on a stopper 14, thus limiting the counterclockwise movement of the lock lever 11 as viewed in the drawing.

In the magnetic disc apparatus, on the other hand, there is an opening member 15 arranged in alignment with the groove 8 to open the shutter 7 in engagement with a front edge 7c when the cassette 2 is inserted into the apparatus.

Also, a closing lever 16 is positioned in the apparatus in parallel with the path of movement of the cassette 2. This closing lever 16 is fixed at its root to the casing of the apparatus. Its free end 16a is formed to a bent shape and arranged to enter the hole 7a when the front edge 7c comes in contact with the opening member 15.

The operation of the conventional mechanism of such construction is as follows: Before the magnetic disc cassette 2 is loaded, the shutter 7 is in the closed position where the hook 11c of the long arm 11a of the lock lever 11 is in engagement with the pawl 7b. Also, the closing lever 16 urges itself in a direction indicated by arrow H by its resilient property.

With the mechanism in such state, when the magnetic disc cassette 2 is being inserted in a direction indicated by arrow C in FIG. 3, the opening member 15 starts to enter the groove 8 and the bent portion 16a of the closing lever 16 rides on the side wall of the shutter 7.

Then, the opening member 15 starts to contact with the outer edge of the arm 11a of the lock lever 11, and then pushes the arm 11a to a direction of arrow A until the hook 11c disengages from the pawl 7b.

As the cassette 2 is further pushed in, the opening member 15 then contacts with the edge 7c of the shutter 7. Thus, the unlocked shutter 7 is restrained in that position. Therefore, the subsequent movement of the cassette 2 causes the shutter 7 to be opened, with the magnetic disc 1 being exposed through the openings 6. During this time, the bent portion 16a of the closing lever 16 remains in the engaged position in the hole 7a of the shutter 7.

Under this condition, magnetic recording or reproduction is carried out by a magnetic head (not shown).

When the cassette 2 is pulled out of the apparatus, the cassette 2 moves in the reverse direction of that indicated by arrow C. Then, because the bent portion 16a of the closing lever 16 rests in the hole 7a of the shutter, the shutter 7 is left behind in that position, when the cassette 2 is first moved.

Then, as the opening member 15 moves away from the lock lever 11, and the arm 11a returns to the direction of arrow B in FIG. 3, soon after that, the pawl 7b contacts with the tapered portion of the end of the arm 11a, then lifts it in the direction of arrow A, and then engages the hook 11c.

With the shutter 7 fully closed, when the cassette 2 is then further pulled, the closing lever 16 bends outward and removes itself from the hole 7a. Thus, the cassette 2 is expelled from the apparatus under the condition that the shutter 7 is completely closed.

This condition can, however, be insured so long as the load against the sliding movement of the shutter 7 is small enough. As the maximum value of the load can reach about 70 g, if such a large load is put on the shutter, the closing member 16, because its hook 16a being of the bent form, hardly takes stable hold on the edge of the hole 7a of the shutter 7. As a result, the shutter 7 cannot be closed automatically.

If such a problem is solved by increasing the springing force of the closing lever 16, then an alternative problem arises that when the lock lever 11 goes under the bent portion 16a of the closing lever 16 before the bent portion 11a reaches the hole 7a, it is caused to lift up, accidentally releasing the shutter 7 from the locking connection. This allows the strong pressure of the bent portion 16a to start opening of the shutter 7 earlier than the prescribed timing, or exposing the magnetic disc 1 ahead of the prescribed position.

If, in such a state, the cassette 2 is pulled out of the apparatus, the operator will get the cassette 2 with its shutter widely open. Hence, the shutter no longer plays a role, leading to a damage of the magnetic disc 1.

Another problem of the conventional mechanism described above is that because the opening member is provided in separation from the closing member, surplus parts become necessary. By this amount, the number of assembling steps is increased to increase the production cost.

SUMMARY OF THE INVENTION

An object of the invention is to eliminate the above-described problems. To achieve this, in an embodiment of the invention, the closing member for the shutter is constructed from a resilient wire by employing such a bending structure that the resultant resilient member has a small acting force on the aforesaid locking means, but a large engaging force on the shutter.

The use of such a structure as has been described above provides assurance that when to open the shutter, the locking means can move under the pressure of the closing member without being deformed in a direction to release the shutter from the locking connection, so that there is no possibility of accidentally opening the shutter in an earlier timing.

Also, since the engaging force of the closing member on the shutter is large, even for a large sliding load of the shutter, the closing member does not slip off from the shutter. Thus, the shutter can be closed without fail.

In another embodiment of the invention, to eliminate the above-described problems, the opening and closing members are constructed from a single continuous resilient wire by employing such a structure that one portion of the wire is bent to function as the closing member for the shutter, and another portion is bent to function as the opening member for the shutter.

The use of such a structure of the abovedescribed embodiment enables the opening and closing means to be installed at a time with an improvement of the accuracy of control of their locations so that the shutter can be opened and closed with high accuracy and reliability.

These and other objects and features of the invention will become apparent from the following description taken in conjunction with the accompanying drawings.

DETAILED DESCRIPTION OF THE PREFERRED EMBODIMENTS

The present invention is next described in great detail in connection with embodiments thereof.

Figure 1:
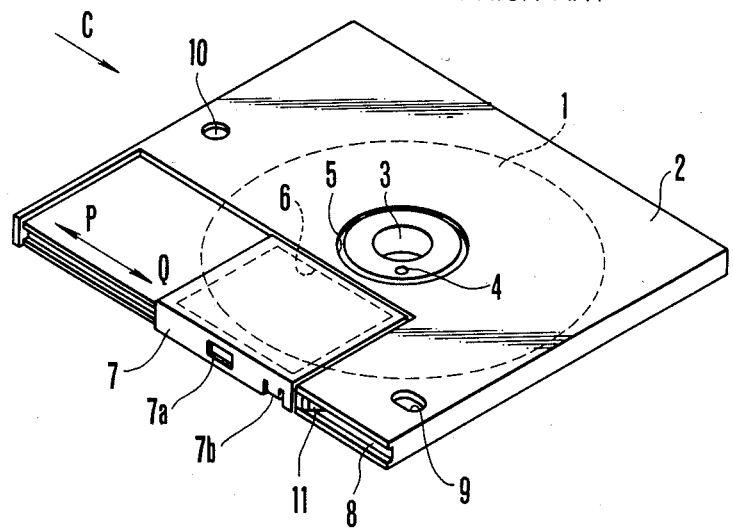
FIGS. 1 to 3 illustrate the conventional mechanism with FIG. 1 being a perspective view of the magnetic disc cassette, FIG. 2 a top plan view of the cassette with its upper panel removed, and FIG. 3 a fragmentary sectional view of the shutter in different operative positions.
Figure 2:
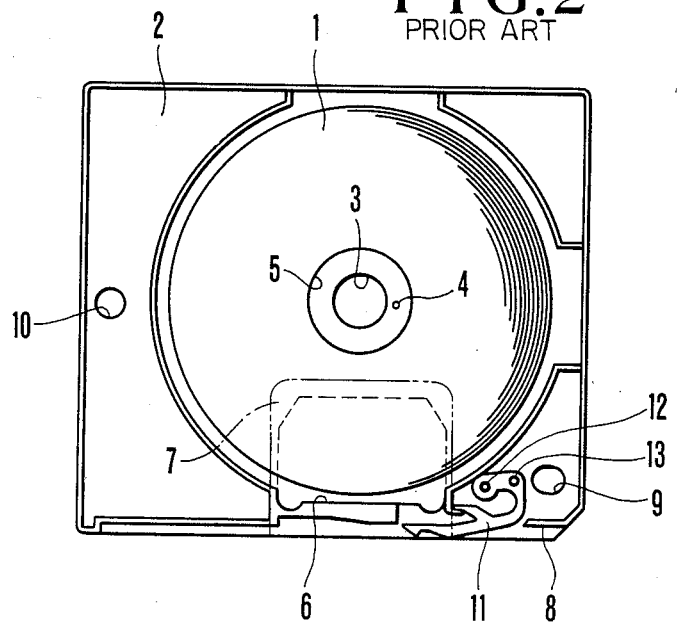
Figure 3:
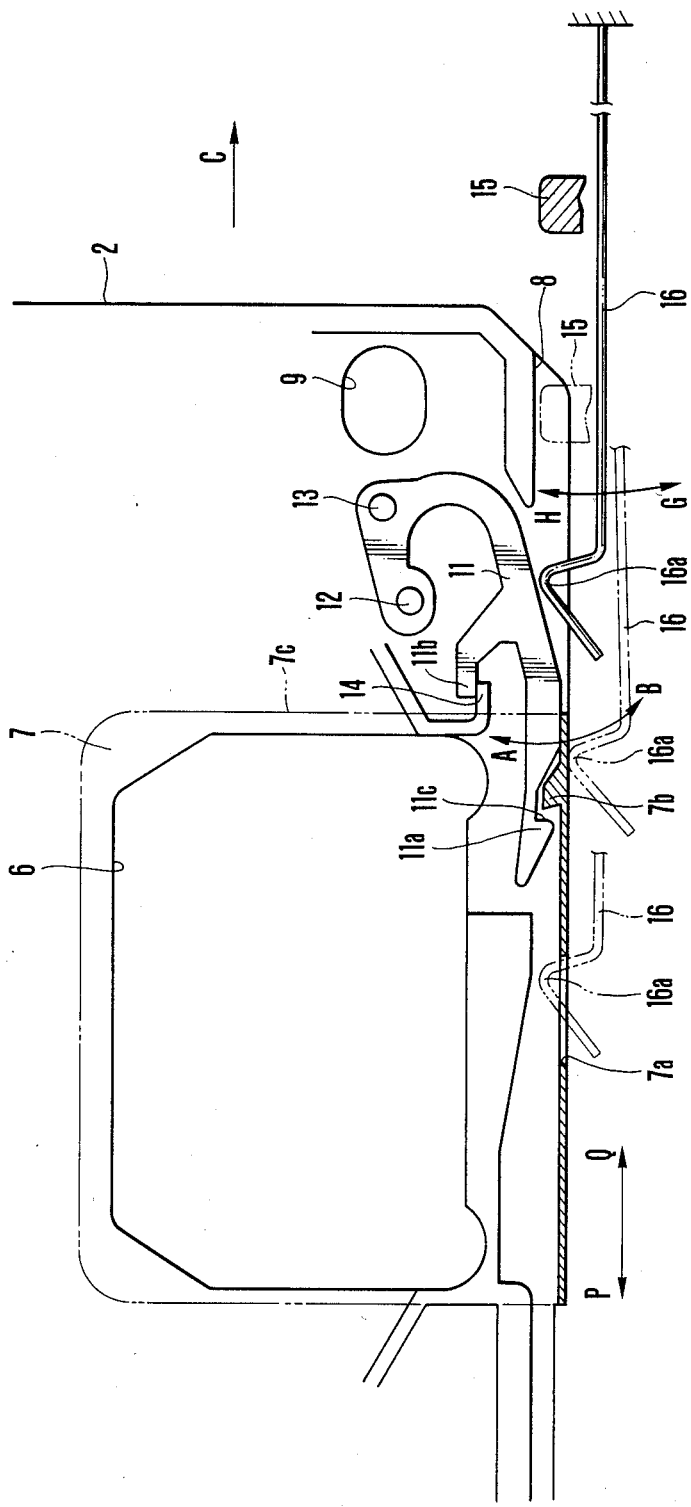
Figure 4:
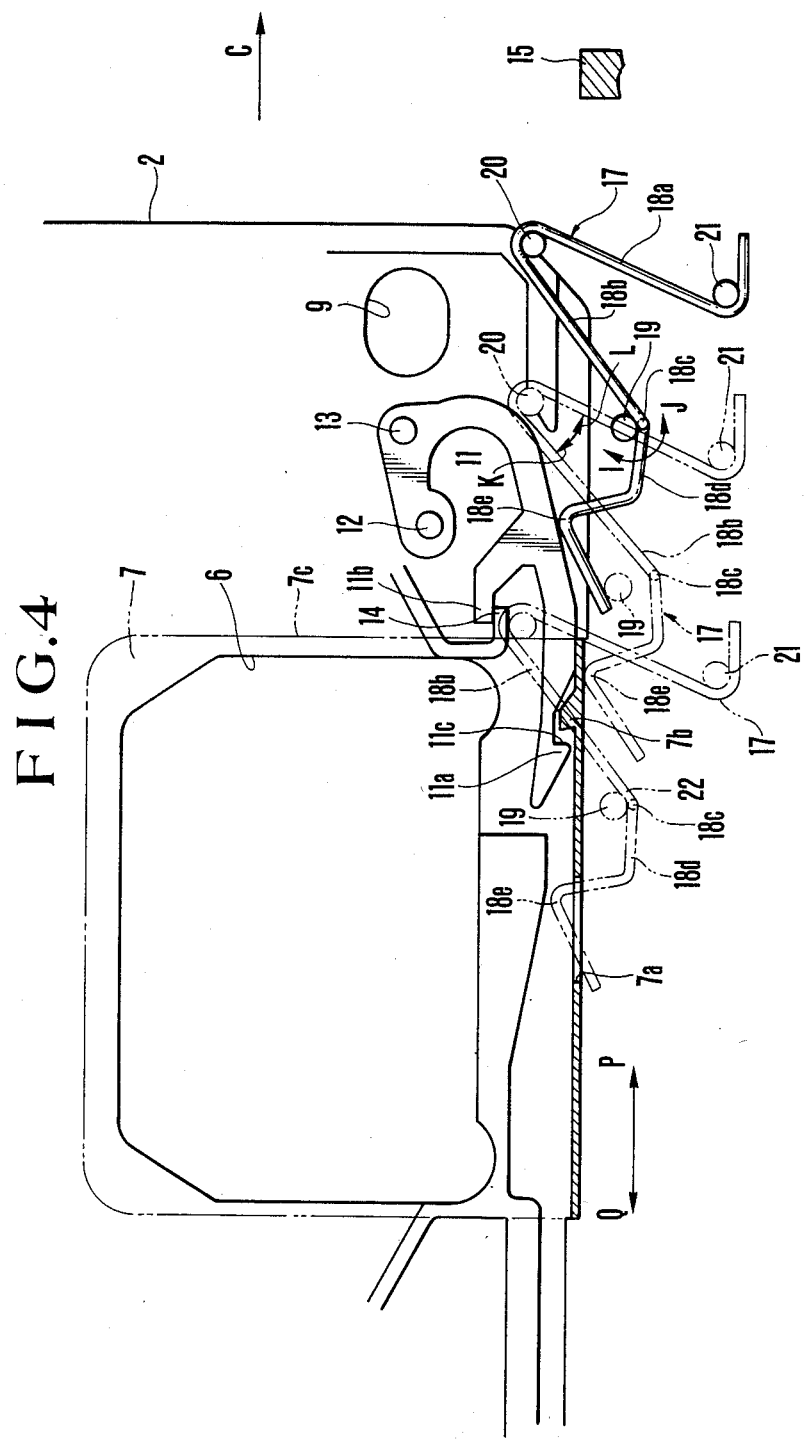
FIGS. 4, 5(A) and 5(B) illustrate an embodiment of the invention, with FIG. 4 being an elevational view of the shutter with a closing member in different operative positions, FIG. 5(A) being a perspective view of an example of the closing member, and FIG. 5(B) showing another example of the structure of the closing member
Figure 5A:
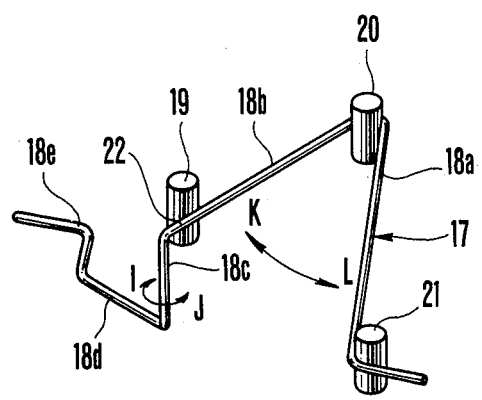
Figure 5B:
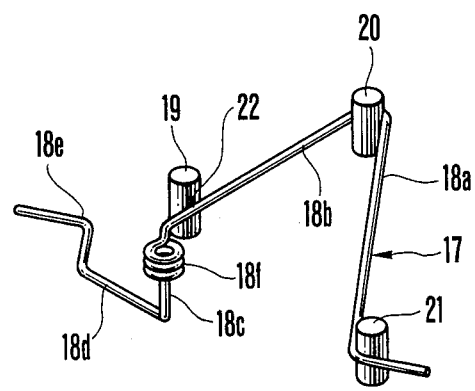

In FIG. 4 and FIGS. 5(A) and 5(B) there is shown one embodiment of the invention where the same reference characters have been employed to denote the similar parts shown in FIGS. 1 to 3.

In this embodiment, a closing member 17 as having the same function as that of the closing lever 16 is positioned in the magnetic disc apparatus.

For note, an opening member 15 for the shutter is similar in construction and arrangement to the conventional one.

The closing member 17 is formed as shown in FIG. 5(A).

That is, the closing member 17 is made up of a steel wire and bent to a general shape almost like letter "V".

That is, the closing member 17 has arms 18a and 18b as extending from the apex of an isosceles triangle. To the end of the arm 18b a vertical line portion 18c is formed in contiguous relation.

And, from the lower end of this vertical shaft 18c, a closing-help arm 18d extends parallel with the path of movement of the cassette 2 to the left as viewed in FIG. 5(A) or to the cassette entrance of the apparatus. The free end of this closing-help arm 18d is formed to a pointed or hooked nose-like shape with its tip 18e extending into the path of movement of the hole 7a of the shutter.

The free end of the arm 18a is trained on a support post 21 fixedly mounted at its upper end to a ceiling of a cassette chamber of the apparatus. The inside of the apex of the arms 18a and 18b is urged to abut on another support post 20 in reaction to the expanding force of the arms 18a and 18b. This expansion is limited when the free end of the arm 18b abuts with its contact outer edge 22 on another support post 19.

The height of the support post 19 to 21 is so short that the space the cassette 2 is to occupy is cleared of them and the arms 18a and 18b.

Also, the closing-help arm 18d and the nose 18e lie in a common horizontal plane. The closing-help arm 18d formed to extend to the cassette 2 to be loaded, and the nose 18e is formed to enter into the groove 8 formed at the side of the cassette 2.

Also, the resilient force of the arm 18b is determined to be smaller than the twisting force of the vertical shaft 18c.

For note, to increase the bias force in the direction of arrow I, a coil spring portion 18f may be formed in the middle of the shaft 18c as shown in FIG. 5(B).

Next, the operation of the embodiment of such construction will be explained.

Before the magnetic disc cassette 2 is loaded, the shutter 7 is closed in the locked state by the lock lever 11 engaging the pawl 7b.

In this state, the magnetic disc cassette 2 is inserted into the apparatus, moving in a direction of arrow C in FIG. 4.

During this time, the cassette 2 does not interfere with any of the support posts 19 to 21, because their lower ends lie high enough not to contact with the upper panel of the cassette 2.

As the insertion of the cassette 2 gets deeper, the nose 18e first fits in the groove 8.

Then, when the lock lever 11 moves under the nose 18e, the latter pushes the arm 11a of the lock lever 11 at the root. But, at this time, as shown by dashed lines in FIG. 4, the contact portion 22 of the arm 18b is allowed to move away from the abutment post 19, as the arms 18b sways in a direction of arrow L. Therefore, the lock lever 11 can never be actuated to release the shutter 7 from the locking connection.

As the cassette 2 is advanced, the nose 18e, soon after after that, rides on the front edge of the side wall of the shutter 7, and then drops in the hole 7a.

In parallel with the above-described operation, similarly to the prior art described in connection with FIG. 3, the opening member 15 is hit by the lock lever 11, which in turn moves its hook 11c from the pawl 7b as the opening member 15 pushes the arm 11a at its root upward.

With the lock lever 11 remaining in this state, when the cassette 2 is further being inserted, the front edge 7c of the shutter 7 collides against the opening member 15, and the shutter 7 is subsequently left stationary in this position, while the opening portions 6 are being exposed wider and wider to the recording or reproducing head.

After the recording or reproducing has finished, the expelling operation of the cassette 2 takes the following steps.

That is, when the cassette 2 is pulled outward, or moved in the reverse direction to that of arrow C, the underside of the nose 18e hooks the front short side of the rectangular hole 7a. The, in turn, the nose 18e is pushed. But, although a force is given through the closing-help arm 18d to turn the arm 18b about the post 20 in the direction of arrow K, such a movement is blocked by the abutment post 19. Thus, the nose 18e reacts to maintain its rigid hold on the front short side of the hole 7a no matter how large the sliding load of the shutter 7 may be.

Therefore, the shutter 7 is held in that position during the time when the casing of the cassette 2 only is pulled out until the shutter 7 is completely closed.

And, the pawl 7b engages the hook 11c to lock the shutter 7. So, the casing of the cassette 2 no longer moves relative to the shutter 7. A further pulling of the cassette 2 out of the apparatus concentrates its force on the nose 18e.

But, because, as has been described above, the arm 18b is hindered from opening by the abutment post 19, the closing-help arm 18d overcomes the twisting force of the shaft 18c in the direction of arrow I and turns in the direction of arrow J, permitting the nose 18e to get out of the hole 7a and then ride on the outer surface of the side wall of the shutter 7. Then, the shutter 7 finally moves away from the closing member 16.

As the above-described operation advances, the lock lever 11 goes under the pressure of the nose 18e without having to return back because, by now, the twisting of the shaft 18c is loosened, and, instead, the arm 18b is swayed. Thus, it is made possible to insure that the cassette 2 can be unloaded with the shutter always closed in the locked state.

In the embodiment of the invention, as has been described above, the closing member 17 is so constructed and arranged that when the shutter is opened, a weak springing force is given to the lock lever, and when the shutter is closed, a strong springing force is given to the shutter. This enables the opening and closing operation of the shutter to be carried out reliably regardless of a large sliding load of the shutter and a small bias force of the lock lever.

For note, the magnetic disc cassette is inserted along a cassette guide usually provided in the apparatus. When the magnetic disc cassette reaches the terminal end of insertion, the cassette guide is automatically moved downward to set the cassette at a prescribed location.

At this time, the cassette is pressed against an abutment by pushing means (not shown), or the so-called over-charging takes place with some shift of the cassette from the as-inserted position.

In the embodiment of the invention, however, since the closing member 17 is formed by the steel wire, it can displace long enough vertically as viewed in FIG. 5 to follow up the over-charging movement of the cassette. Therefore, there is not possibility of damaging both of the cassette and the opening and closing mechanism.

For note, though, in the illustrated embodiment, the closing member 17 is all formed by being a single steel wire or uniform cross-sectional shape and area, it may otherwise be constructed either with leaf springs and steel wire segments in combination, or by changing the cross-sectional shape and size of its area from portion to portion when a single steel wire is used as the start material.

As is obvious from the foregoing, according to this embodiment, the closing member for the shutter is constructed from a resilient material in such a way and so arranged that the locking means even though having a small bias force can pass under its pressure without being actuated to release the shutter and, after it has engaged the hole of the shutter, the outward movement of the casing of the cassette cannot cause the shutter to follow until the openings 6 are completely closed by the shutter, no matter how large the load against the sliding movement of the shutter may be.

A second embodiment of the invention is described by reference to FIGS. 6 and 7(A) were the same reference characters have been employed to denote the similar parts to those shown in FIGS. 1 to 5(B).

In this embodiment, an opening and closing member 17 having the same functions as those of the opening pawl 15 and the closing lever 16 is provided in the magnetic disc apparatus disc apparatus.

Figure 7A:
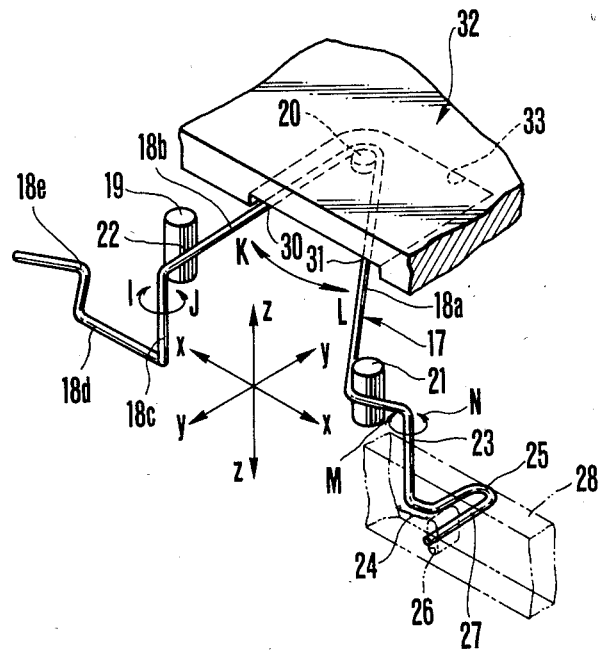

The opening-closing member 17 is formed as shown in FIG. 7(A).

That is, the opening-closing member 17 is constructed by bending a steel wire to a general shape almost like the letter "V".

That is, the opening-closing member 17 has two arms 18a and 18b of almost equal length to each other with a common end bent in a way for them to form both sides of a triangle. The opposite end of the second arm 18b is contiguous to a vertically downward pointed portion or vertical shaft 18c. From the lower end of this shaft 18c, a closing-help arm 18d extends to the left as viewed in FIG. 7(A). The free end of this arm 18d is formed to a hooked nose 18e.

The opposite end of the first arm 18a is turned on a short support post 21 of round cross-section fixedly mounted on the ceiling of a chamber for the cassette in the apparatus. The common end of the first and second arms 18a and 18b rest on the outside of another support post 20. The second arm 18b is urged to abut on a post 19 because the arms 18a and 18b are biased by themselves to open wide.

For note, the posts 19 to 21 have their lower ends above the path of the magnetic disc cassette so that they do not interfere with the cassette.

Also, the closing-help arm 18d and the nose like bent portion 18e lie in the same horizontal plane, and the closing-help arm 18d extends in parallel with the path of insertion of the cassette toward the entrance therefor so that the nose 18e can enter the groove 8.

Also, the resilient force of the second arm 18b is determined to be weaker than the twisting force of the vertical shaft 18c.

The above-described portions 18b to 18e constitute the closing means for the shutter.

Meanwhile, the rear half of the steel wire beginning with the opposite end of the first arm 18a to the common end thereof constitutes opening means.

That is, at a short distance away from the post 21, that part of the wire which extends from the opposite end of the first arm 18a is bent vertically downward to form a second shaft 23 of an almost equal length to that of the first shaft 18c.

The lower end of the second shaft 23 is contiguous to a rearwardly extended horizontal portion 24 of relatively short length.

From the rear end of this horizontal portion 24, an opening pawl 25 is formed to an almost letter "U" shape, extending toward the cassette.

This opening pawl 25 lies in a horizontal plane which coincides with that of the closing-help arm 18d.

An abutment block 28 on the inner surface of which the horizontal portion 24 rests is positioned in the magnetic disc apparatus so that the rotation of the vertical shaft 23 in a direction of arrow M is restrained.

Across the thickness of the abutment block 28 is formed a slot 26 as elongated vertically (in the instance of FIG. 7(A), in a Z direction). The free end 27 of the opening pawl 25 is vertically movably fitted in that slot 26, but is restrained from movement in a direction X.

For note, because the horizontal portion 24 and the vertical portion 23 are in contact with the inner surface of the abutment block 28, this block 28 also serves to inhibit the arm 18a from turning away from the post 21 to the direction of arrow K in FIG. 7(A).

Another abutment member 32 is positioned above the closing means in fixedly secured relation to the framework of the apparatus. A square, shallow recess 33 is formed in the lower surface of the second abutment block 32. The above-described support post 20 lies in this recess 33.

Also, the aforesaid first and second arms 18a and 18b contact with the bottom surface of the recessed portion 33 in their portions adjacent to the post 20, and also with the respective side walls of the recessed portion 33 at points 30 and 31 respectively.

Next, the operation of the opening and closing mechanism of FIGS. 6 and 7(A) will be explained.

Before the magnetic disc cassette 2 is loaded, the shutter 7 is in the closed position with the lock lever 11 acting on the pawl 7b to lock the shutter.

Figure 6:
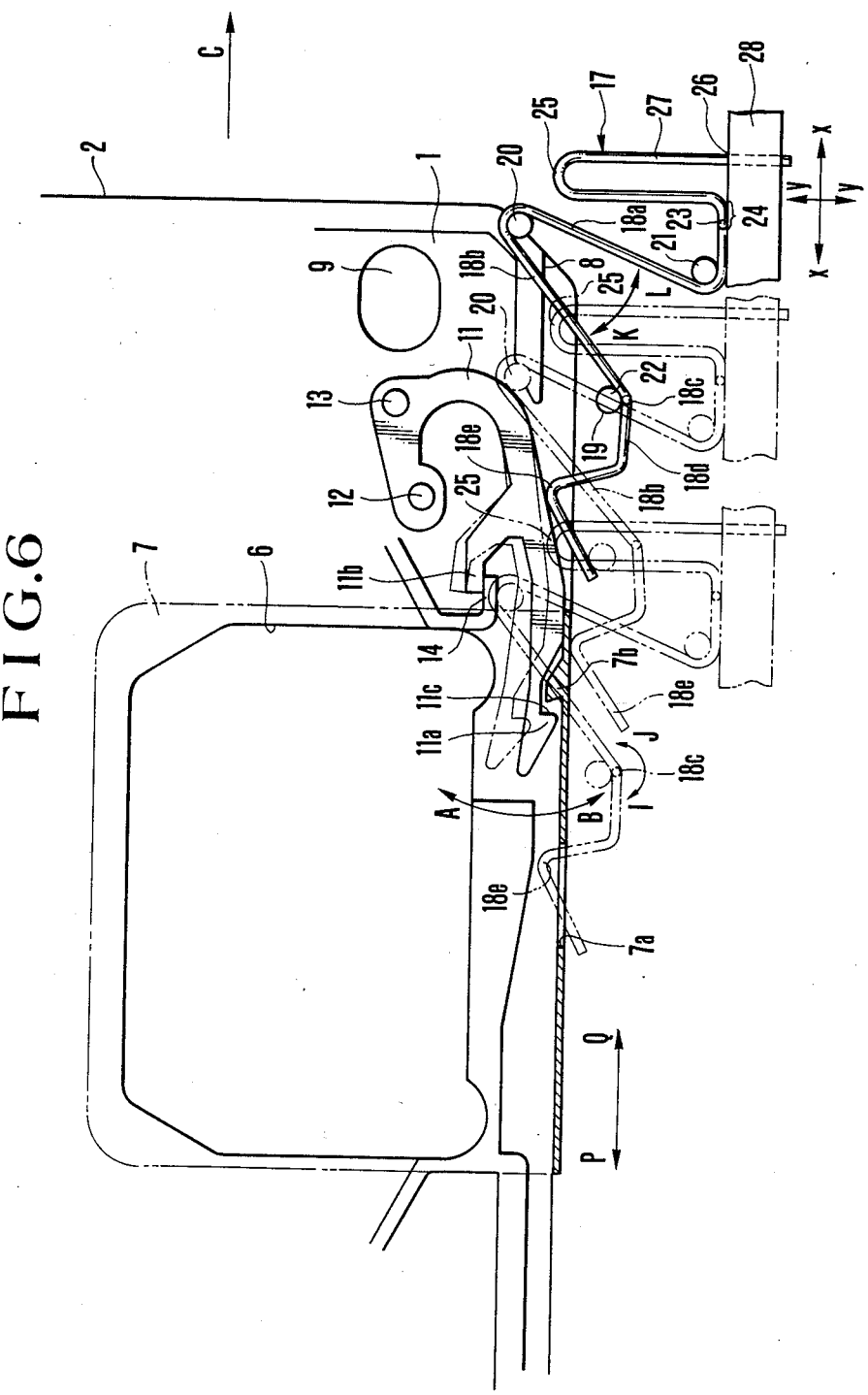
FIGS. 6 and 7(A) illustrate another embodiment of the invention, with FIG. 6 being an elevational view showing a manner in which the opening and closing members for the shutter operate, and FIG. 7(A) being a perspective view showing the structure and arrangement of these members.

With the shutter in this state, when the cassette 2 is inserted into the recording or reproduction apparatus, it moves in the direction of arrow C in FIG. 6.

Since the lower ends of the posts 19 to 21 occupy positions not in contact with the upper surface of the cassette 2, during the insertion the cassette 2 does not interfere with them.

As the cassette 2 is being inserted, the front end of the groove 8 catches the nose 18e of the closing means.

Then, the lock member 11 goes under the pressure of the nose 18e. Although the lock lever 11 is pushed upward at its root, it is at this time that, as shown by the dashed lines in FIG. 6, the second arm 18b reacts to move its contact portion 22 away from the abutment post 19, being swayed to the direction of arrow L. Thus, the arm 11a of the lock lever 11 is not turned long enough to release the shutter 7 from the locking connection.

As inserting of the cassette 2 advances, the nose 18e, soon after that, rides on the outer surface of the side wall of the shutter 7 and then drops in the hole 7a.

In parallel with the foregoing procedure, the opening pawl 25 is taken in the groove 8. Then, the lock lever 11 comes to contact at its root with the opening pawl 25.

For this case, however, because the opening means has its horizontal portion 24 in contact with the inner surface of the first abutment block 28, and the free end 27 of its pawl 25 in engagement with the slot 26, the lock lever 11 is turned inward by the opening pawl 25 to disengage its hook 11c from the pawl 7b at the same time when the nose 18e of the closing means enters the hole 7a.

Just at this time, the opening pawl 25 starts to open the shutter 7. Upon further insertion of the cassette 2, the shutter 7 in turn opens fully as it apparently moves in the direction of arrow P, exposing the magnetic disc 1 through the opening portions 6.

With the cassette 2 in this state, magnetic recording or reproducing is carried out.

Conversely when the cassette 2 is to be pulled out of the apparatus, a sequence of the following operations takes place.

That is, at the start of movement of the cassette 2 in the reverse direction to that of arrow C from the loaded position, the underside of the hooked nose 18e takes hold on the rear end of the hole 7a. This hold is maintained rigid no matter how large the load on the sliding movement of the shutter 7, because the second arm 18b is hindered from opening to the direction of arrow K by its contact portion 22 engaging on the abutment post 19, when the pulling force is transmitted through the closing-help arm 18d to turn the arm 18b about the support post 20.

Therefore, the shutter 7 is left behind in that latched position, when the casing of the cassette 2 only moves outward. Thus, the shutter 7 is closed automatically.

When the pawl 7b engages the hook 11c to lock the shutter 7, a further pulling of the cassette 2 then concentrates the force of the operator all at the nose 18e.

But, because, as has been described above, the arm 18b is hindered from opening by the abutment post 19, for that force overcomes the twisting force of the vertical shaft 18c in the direction of arrow I, the closing-help arm 18d is turned about the shaft 18c in the direction of arrow J, permitting the nose 18e to slip off from the hole 7a. Just after that, the twisted shaft 18c is allowed to release energy as the arm 18b turns about the post 20 in the direction of arrow L to absorb it. Therefore, the lock lever 11 can pass under the nose 18e without causing the locking of the shutter 7 to be broken.

In the second embodiment of the invention, as has been described above, use is made of only one contiguous steel wire in constructing both of the opening and closing members by bending methods for a structure such that one half of the wire constitutes the opening means and the other half constitutes the closing means. The closing means is so arranged that when the cassette is inserted, a weak force is put on the lock lever, and when it is pulled out, a strong holding force can be given to the shutter. Because the closing means is made not to deform until the shutter is completely closed, even when the load on the sliding movement of the shutter is large, and despite the bias force of the lock lever is small, it is made possible to open and close the shutter with high accuracy and reliability.

Another advantage arising from the use of a common set of material for making up the closing and opening means is that the number of parts of the closing and opening mechanism is reduced, and the assembling operation becomes easy, leading to lower the production cost.

For note, loading of the magnetic disc cassette is first manually operated with the aid of a cassette guide provided in the apparatus. After the cassette has reached the terminal end of movement, the cassette guide is automatically moved downward to set the cassette in a prescribed position.

At this time, the cassette is pressed against an abutment by over-charging means (not shown). Hence, there is a gap between the fully inserted and the set position of the cassette.

In the embodiment of the invention, however, the opening and closing mechanism, because of its being made up of the resilient material such as steel wire in three-dimentionally flexible form, is able to deform within the range of linear elastic behavior so that it can follow up the movement of the cassette in the downward direction as viewed in FIG. 7(A), thereby giving an additional advantage that the possibility of damaging the cassette and the opening and closing mechanism is reduced to zero.

Figure 7B:
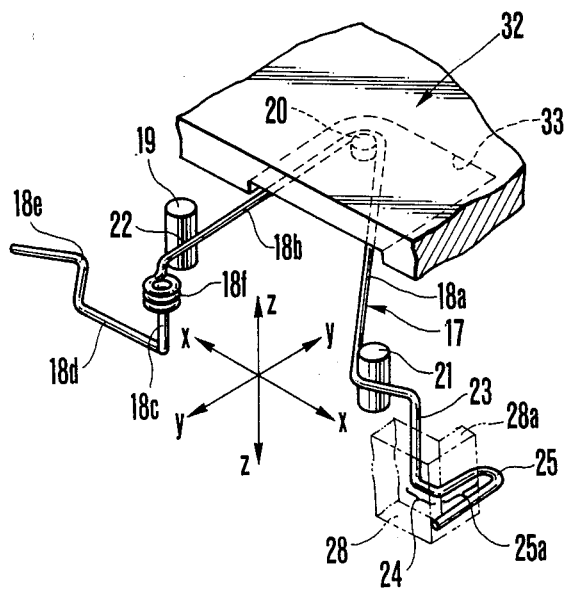
FIGS. 7(B) to 7(D) are perspective views of third to fifth embodiments of the opening and closing mechanism according to the invention.

FIG. 7(B) illustrates a third embodiment of the invention which is different from the FIG. 7(A) embodiment in that a torsion coil spring portion 18f is provided in the middle of the first vertical shaft 18c.

The formation of the torsion coil spring portion 18f is to increase the twisted force of the vertical shaft 18c within the limitations of linear elastic behavior, thus improving the reliability of the closing function of the shutter.

Another difference is that, in this embodiment, the abutment block 28 is formed to an almost letter "L" cross-section with its lower stroke 28a intervening between the vertical two strokes of the letter "U" shaped opening pawl 25. Hence, one vertical stroke 25a of the opening pawl 25 rests on the inner surface of the bentoff portion 28a of the abutment block 28.

Therefore, the opening pawl 25 does not deform in the direction of arrow X so that the shutter can be opened without fail.

Figure 7C:
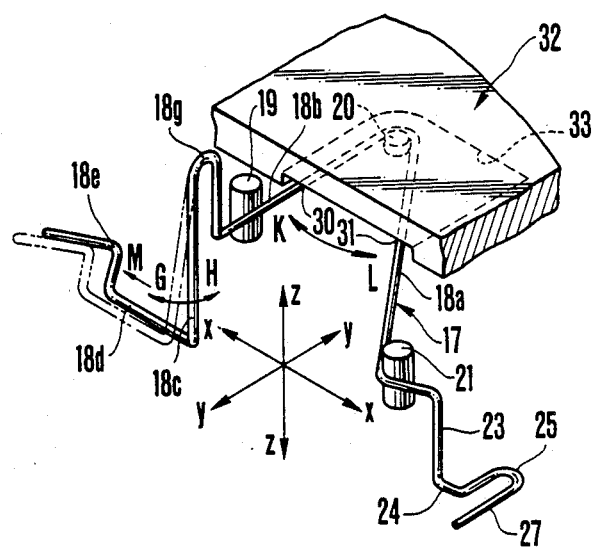

FIG. 7(C) illustrates a fourth embodiment of the invention where the abutment block 28 is not shown for the purpose of simplicity.

In this embodiment, instead of the torsion coil form, a hair pin form is used. That is, a letter "U" shaped portion 18g is provided between the upper end of the vertical shaft 18c and the opposite end of the second arm 18b.

The use of such a structure results in that, differing from the first to third embodiments where the slipping-off of the nose 18e from the hole 7a of the shutter 7 is relied on the twisting of the vertical shaft 18c, the vertical shaft 18c can pendulate to bring the nose 18e away perpendicularly of the shutter 7 when the nose 18e off from the hole 7a of the shutter 7, as shown in FIG. 7(C).

For note, at this time, another force of direction M is applied to the nose 18e so that, even in this case, the vertical portion 18c is twisted to some degree. But, at the same time, the vertical portion 18c escapes in the direction of arrow G to facilitate disengagement of the nose 18e from the hole 7a of the shutter 7.

Also, when the shutter 7 is to open, the swaying movement of the arm 18b in the direction of arrow L and the pendulating movement of the vertical portion 18c to the direction of arrow G can simultaneously occur, thus improving the degree of flexibility of the closing means on the lock lever. Therefore, even when the lock lever has a very weak bias force, this mechanism of FIG. 7(C) can cope with it.

Figure 7D:
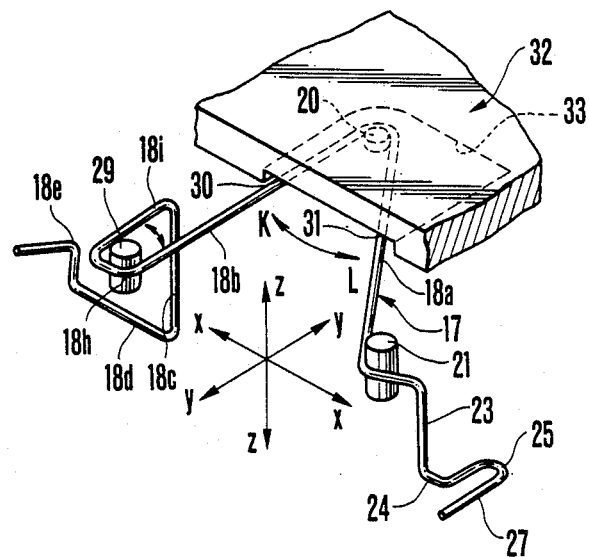

FIG. 7(D) illustrates a fifth embodiment of the invention where a semi-circular portion 18h of large radius is provided on the opposite end of the second arm 18b, and the inside of this semi-circular portion 18h is in contact with a post 29.

The opposite arm 18i of the semi-circular portion 18h to that which is contiguous to the arm 18b is extended in a horizontal plane toward the cassette. Its end is then followed by the vertically downward portion 18c. From the lower end of this portion 18c, the closing-help arm 18d and the nose-like bent-off portion 18e are formed in a similar manner to that described in connection with the foregoing embodiments.

With the use of such a structure, when opening the shutter, the arm 18b sways away from the post 29 in the direction of arrow L so that the lock lever is not actuated. But when closing the shutter, the vertical portion 18c is slightly twisted, and the arm 18i sways away from the arm 18b to allow for the nose 18e to slip off from the hole 7a of the shutter 7.

Even by the use of such a structure, similar advantages to those of the above-described embodiments are produced.

For note, though all the foregoing embodiments have been described in connection with the opening and closing members made up of a steel wire whose cross-sectional shape and area are uniform over the entire length thereof, they may otherwise be constructed from a leaf spring or springs and a steel wire segment or segments in combination, or by bending a single leaf spring alone in a similar way to that described above.

As is obvious from the foregoing, according to the embodiments of the invention, the opening and closing members are made up of resilient material and are constructed with their various bent portions in a specified way to provide assurance of highly-accurate and highly-reliable opening and closing of the shutter even for a cassette whose load on the sliding movement of the shutter is large and whose lock member has a small biasing force.

Further, the opening and closing mechanism of the invention can absorb sufficiently the overcharging movement of the cassette when loaded in the apparatus.

What is claimed is:

1. A shutter opening and closing mechanism in a recording and reproduction apparatus which uses a cassette, the cassette having a freely openable and closable shutter and locking means for locking the shutter in a closed state, comprising:
   lock releasing means for releasing the locking means of the shutter;
   shutter opening means for opening the shutter when its locking means is released by said lock releasing means; and
   shutter closing means having a torsion section that creates a twisting force in a plane substantially parallel to a direction of movement of the cassette relative to the shutter opening and closing mechanism for engaging with an engaging part of the shutter and closing the same, wherein said shutter closing means is resiliently biased toward the cassette and has a first force acting on the locking means which is smaller than a releasing force required to release said locking means, and a second force acting on the engaging part of the shutter such that the shutter will not be disengaged from said engaging part when the shutter is being closed.

2. A mechanism according to claim 1, wherein said shutter closing means engages with the engaging part of the cassette after being in slight contact with the locking means when the cassette is being loaded into the apparatus.

3. A mechanism according to claim 2, wherein said shutter closing means acts with a weak force when the cassette is being inserted into the apparatus but acts with a strong force when the cassette is being discharged from the apparatus.

4. A mechanism according to claim 2, wherein said shutter closing means does not bias the shutter and locking means when the cassette is moved in a loading direction into the apparatus, but engages with the engaging part of the shutter when the cassette is discharged from the apparatus and closes the shutter by a cassette discharging action.

5. A mechanism according to claim 4, wherein said shutter closing means is a resilient member.

6. A mechanism according to claim 5, wherein said resilient member comprises steel wire.

7. A mechanism according to claim 5, wherein said shutter closing means has a slanted surface which initially enters the engaging part of the cassette when it is being inserted into the apparatus, and a checking portion contiguous with the slanted portion which contacts the engaging part and closes the shutter as the cassette is being discharged from the apparatus.

8. A mechanism according to claim 1, wherein said lock releasing means is formed integrally with said shutter closing means.

9. A mechanism according to claim 8, wherein said shutter closing means and said lock releasing means are formed integrally from a resilient member and have a plurality of bent portions, and are supported at predetermined positions by having said bent portions engaged to a plurality of pins provided within the apparatus.

10. A shutter opening and closing mechanism in an apparatus which uses a cassette having a freely openable and closable shutter and locking means for locking the shutter in a locked state, comprising:
opening means for opening the shutter; and
closing means for closing the shutter,
wherein said opening and closing means are formed from a resilient member having a portion thereof bent to form said closing means for closing the shutter and a portion bent to form said opening means for opening the shutter.

11. A mechanism according to claim 10, wherein said closing means engage with the shutter after being guided passed the locking means when the cassette is being inserted into the apparatus.

12. A mechanism according to claim 11, wherein said closing means acts with a weak force on the locking means of the cassette so as not to release the locking means but acts with a strong force when the cassette is moved in a discharging direction from the apparatus.

13. A mechanism according to claim 12, wherein said opening and closing members do not bias the shutter and locking means when the cassette is moved in a loading direction into the apparatus, but engage with the engaging part of the shutter for checking the shutter when the cassette is discharged out of the apparatus to close the shutter as the cassette is being discharged from the apparatus.

14. A mechanism according to claim 10, wherein said closing means act with a weak force on the shutter when the shutter is being opened and with a strong force on the shutter when the shutter is being closed.

15. A mechanism according to claim 14, wherein said closing means has a first slanted part which initially enters the engaging part of the cassette when it is being inserted into the apparatus, and a checking portion contiguous with the slanted portion which contacts the engaging part and closes the shutter as the cassette is being discharged from the apparatus.

* * * * *

UNITED STATES PATENT AND TRADEMARK OFFICE
CERTIFICATE OF CORRECTION

PATENT NO. : 4,792,873

DATED : December 20, 1988

INVENTOR(S) : Tsukasa Uehara

It is certified that error appears in the above-identified patent and that said Letters Patent is hereby corrected as shown below:

COLUMN 1

Line 42, "upwardly" should read --inwardly--.

COLUMN 3

Line 15, "to open" should read --opening--; and

Line 32, "abovedescribed" should read --above-described--.

COLUMN 5

Line 4, "after" should be deleted.

COLUMN 6

Line 40, "disc apparatus" (first occurrence) should be deleted.

UNITED STATES PATENT AND TRADEMARK OFFICE
CERTIFICATE OF CORRECTION

PATENT NO. : 4,792,873

DATED : December 20, 1988

INVENTOR(S) : Tsukasa Uehara

It is certified that error appears in the above-identified patent and that said Letters Patent is hereby corrected as shown below:

COLUMN 12

Line 16, "passed" should read --past--.

Signed and Sealed this

Twenty-fifth Day of July, 1989

Attest:

DONALD J. QUIGG

Attesting Officer

Commissioner of Patents and Trademarks